United States Patent
Ginn

(10) Patent No.: US 6,362,837 B1
(45) Date of Patent: Mar. 26, 2002

(54) METHOD AND APPARATUS FOR SIMULTANEOUSLY INDICATING RATING VALUE FOR THE FIRST DOCUMENT AND DISPLAY OF SECOND DOCUMENT IN RESPONSE TO THE SELECTION

(75) Inventor: Michael R. Ginn, San Francisco, CA (US)

(73) Assignee: Michael Ginn, San Francisco, CA (US)

( * ) Notice: Subject to any disclaimer, the term of this patent is extended or adjusted under 35 U.S.C. 154(b) by 0 days.

(21) Appl. No.: 09/072,805

(22) Filed: May 5, 1998

Related U.S. Application Data

(60) Provisional application No. 60/056,153, filed on Aug. 19, 1997, and provisional application No. 60/044,014, filed on May 6, 1997.

(51) Int. Cl.$^7$ ................................. G09G 5/00
(52) U.S. Cl. .................. 345/751; 345/759; 345/738; 345/764; 345/781; 345/835; 707/5; 707/501.1; 707/513; 707/102
(58) Field of Search .................. 707/1–10, 100–104, 707/200–206, 501.1, 512–513, 526, 531, 104.1, 102, 5; 705/10, 26–27, 51; 706/45–52; 395/200.34, 200.32, 200.47, 200.49; 345/764, 835, 839, 840, 751, 759, 781, 738, 745, 744

(56) References Cited

U.S. PATENT DOCUMENTS

| | | | | |
|---|---|---|---|---|
| 5,659,732 A | * | 8/1997 | Kirsch ........................... 707/5 |
| 5,742,768 A | * | 4/1998 | Gennaro et al. .................... 1/1 |
| 5,864,871 A | * | 1/1999 | Kitain et al. ................. 707/104 |
| 5,872,850 A | * | 2/1999 | Klein et al. .................... 705/51 |
| 5,895,470 A | * | 4/1999 | Pirolli et al. ................ 707/102 |
| 5,905,988 A | * | 5/1999 | Schwartz et al. ........... 707/104 |
| 5,911,043 A | * | 6/1999 | Duffy et al. ........... 395/200.33 |
| 5,913,215 A | * | 6/1999 | Rubinstein et al. .......... 707/10 |
| 5,918,014 A | * | 6/1999 | Robinson ............... 395/200.49 |
| 5,943,670 A | * | 8/1999 | Prager ........................... 707/5 |
| 5,961,591 A | * | 10/1999 | Jones et al. ................. 709/217 |
| 5,974,412 A | * | 10/1999 | Hazlehurst et al. ............ 707/3 |

OTHER PUBLICATIONS

Yuwono, B; Lee, D.L., search and ranking algorithms for locating resources on the world wide web, IEEE 1996, and 164–171, Feb. 1996.*
ebay, [from internet], pp 1–2, 1995.*
deja.com, [from internet], pp. 1–2, 1995.*

* cited by examiner

Primary Examiner—Jack Choules
Assistant Examiner—Srirama Channavajjala
(74) Attorney, Agent, or Firm—Townsend and Townsend and Crew

(57) ABSTRACT

A method for navigating within a message thread on a computer system having a memory and a display, includes the steps of displaying a message on the display, displaying an icon on the display, the icon including a first portion and a second portion, receiving a selection signal of the icon at the first portion of the icon or the second portion of the icon, performing a navigation function within the message thread when the icon is selected, and performing a rating function of the message when the first portion of the icon is selected.

27 Claims, 3 Drawing Sheets

METHOD AND APPARATUS FOR SIMULTANEOUSLY INDICATING RATING VALUE FOR THE FIRST DOCUMENT AND DISPLAY OF SECOND DOCUMENT IN RESPONSE TO THE SELECTION

CROSS REFERENCE TO RELATED APPLICATIONS

This application claims priority from the provisional patent application entitled METHOD AND APPARATUS FOR DOCUMENT CLASSIFICATION AND NAVIGATION, filed Aug. 19, 1997 and assigned Application No. 60/056,153, and also claims priority from the provisional patent application entitled METHOD AND APPARATUS FOR DOCUMENT CLASSIFICATION AND NAVIGATION, filed May 6, 1997 and assigned Application No. 60/044,014, the disclosures of which are hereby incorporated in their entirety for all purposes.

BACKGROUND OF THE INVENTION

The present invention relates to document classification and navigation. More specifically, the present invention relates to methods and apparatus for simultaneously classifying and navigating through message threads.

In a typical messaging system, users navigate through and among message threads by manually selecting messages to read, and the direction of message navigation, i.e. the next message to read. Because the number of messages published increases every day, what users typically desire is a way to read messages that are "worthy" of being read or reading messages from "worthy" authors.

One partial solution is implemented by having users rate messages they have read. That is, after a user reads a message, the user may rate the message as good or bad, etc. As different users read the message, an average rating value can be determined for the message. When a new user sees the rating value of the message, the user may decide to skip it if the message is lowly rated, read it if the message is highly rated, etc.

A problem with message rating or classification is that users must manually navigate through messages and manually classify the message. That is, typically the Messaging system provides separate functionality that the user uses to navigate through messages and that the users use to rate or classify messages.

What is needed are improved methods and apparatus for rating messages.

SUMMARY OF THE INVENTION

The present invention discloses methods and apparatus for document classification and navigation.

In the preferred embodiment of the present invention, navigation and classification does not require additional user effort. Typically, the user is given a default direction for navigation which the user may change, if desired. In order to navigate to the next message, the user must first rate or classify the current message, or indicate that the user does not want to classify the current message. By reducing the effort required for users to classify messages, this invention increases the number of users who classify messages, thereby increasing the amount of user feedback. Thus, a messaging system incorporating the preferred embodiment of the present invention will have more value than a traditional messaging system.

According to an embodiment of the present invention, a method for displaying messages on a computer system having a memory and a display, includes the steps of displaying a first message on the display, providing a first user-selectable region on the display, and providing a second user-selectable region on the display. The method also includes the steps of selecting the first selectable region on the display; and simultaneously indicating a rating value for the first message and requesting display of a second message on the display in response to selection of the first selectable region.

According to another embodiment, a computer program product for a computer system for displaying messages on a user computer system including a processor and a display, includes a computer-readable media including code that directs the processor to provide a first message to the user computer system, code that directs the processor to provide a first user-selectable region to a display on the user computer system, and code that directs the processor to provide a second user-selectable to a display on the user computer system. The computer-readable media also includes code that directs the processor to determine a selection of the first selectable region on the display of the user computer system, and code that directs the processor to determining a rating value for the first message and to provide a second message to the user computer system, in response to the selection of the first selectable region.

According to another embodiment of the present invention a computer system for providing document navigation for a user computer system includes means for providing a first document to the user computer system, means for providing an icon for display on the user computer system, the icon including a first portion and a second portion, and means for receiving a selection signal of the icon at the first portion of the icon of the second portion of the icon from the user computer system. The computer system also includes means for providing a second document to the user computer system when the icon is selected, and means for performing a rating function on the first document when the first portion of the icon is selected.

Further understanding of the nature and advantages of the invention may be realized by reference to the remaining portions of the specification and drawings.

DESCRIPTION OF SPECIFIC EMBODIMENTS

System Overview

Figure 1:
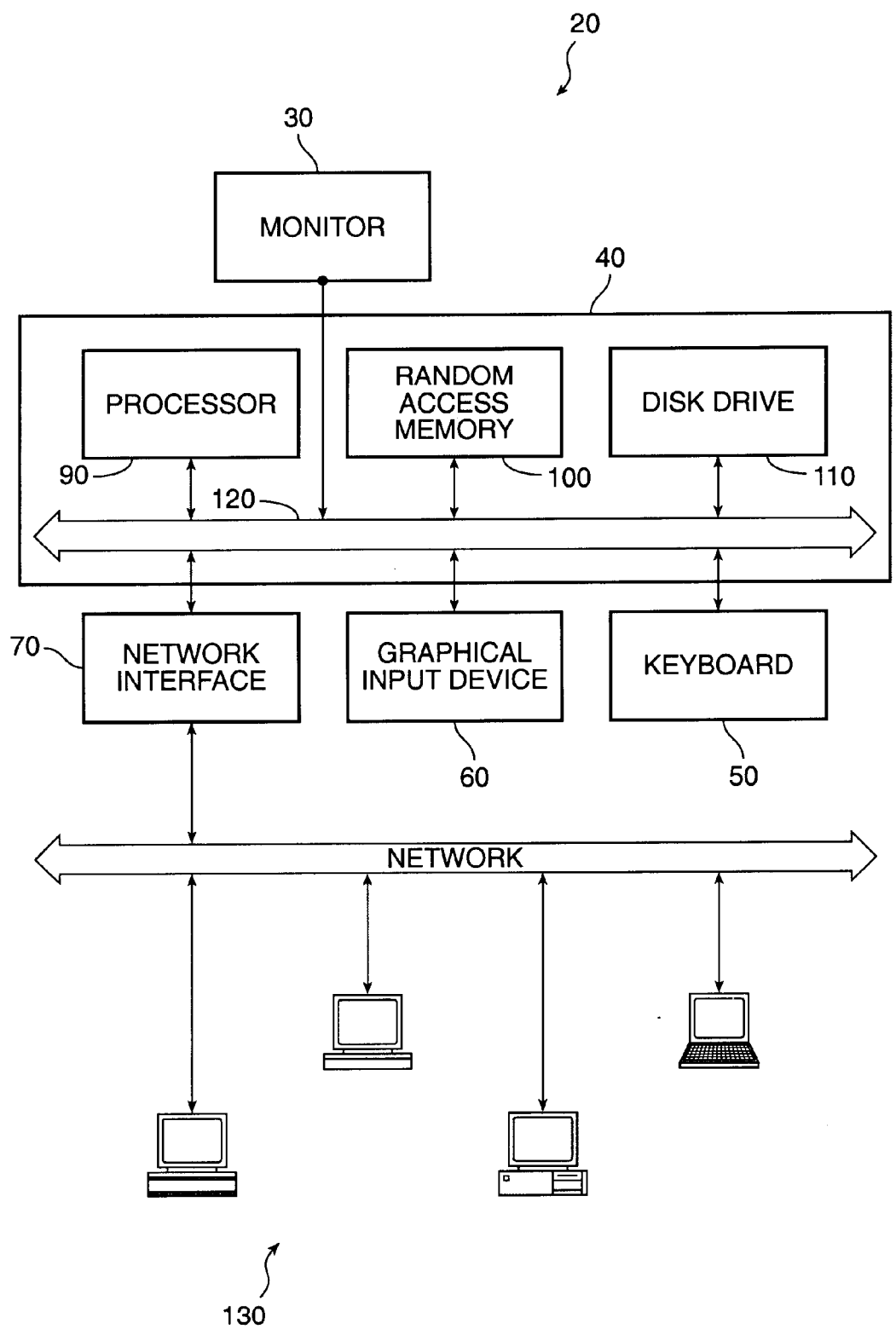
FIG. 1 is a block diagram of an embodiment of the present invention.

FIG. 1 is a block diagram of a host system 20 according to a preferred embodiment of the present invention. Host system 20 includes a monitor 30, a computer 40, a keyboard 50, a graphical input device (for example, a mouse) 60, and a network interface card 70. Computer 40 includes familiar computer components such as a processor 90, and memory storage devices, such as a random access memory (RAM) 100, a disk drive 110, and a system bus 120 inter connecting the above components.

A mouse is but one example of a graphical input device 60, also known as a pointing device, a digitizing tablet is another. RAM 100 and disk drive 110 are examples of tangible media for storage of computer programs, other types of tangible media include floppy disks, removable hard disks, optical storage media such as CD-ROMS and bar codes, semiconductor memories such as flash memories, read-only-memories (ROMS), ASICs, and battery-backed volatile memories, and the like. Network interface card 70 may be any conventional interface means such as a modem, an Ethernet interface card, etc.

In a preferred embodiment, Host system 20 includes a 586 microprocessor-class based computer, running Micro soft Windows95™ operating system, and software available from the present assignee.

As illustrated in FIG. 1, any number of users using computers 130 can be coupled to host system 20 via any conventional network i n order to read and classify messages resident on host system 20. In the preferred embodiment, users using computers 130 communicate to host system 20, for example with an Internet browser such as Netscape Navigator using TCP/IP.

FIG. 1 is representative of but one type of system for embodying the present invention. It will be readily apparent to one of ordinary skill in the art that many system types and configurations are suitable for use in conjunction with the preferred embodiment of the present invention.

System Operation

Figure 2:
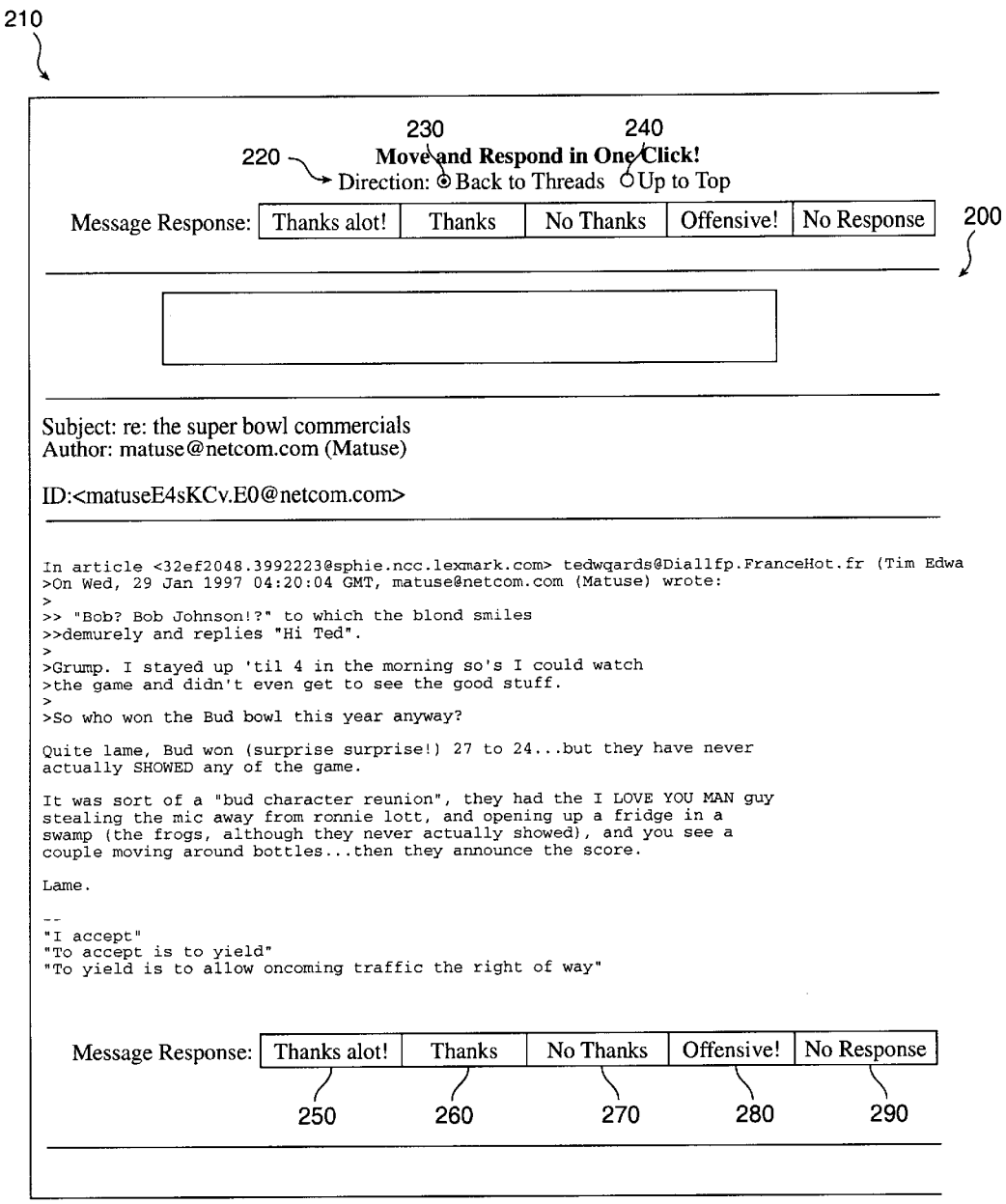
FIG. 2 illustrates an embodiment of the present invention.

FIG. 2 illustrates a typical graphical user interface (GUI)—200 according to the preferred embodiment of the present invention. FIG. 2 illustrates a display of one or more messages in a discussion group.

Such a GUI typically includes:

1. Areas which can be clicked on which supply menus; hereinafter, these areas will be called menu bars—210.

2. "Radio button area—220": a radio button area consists of a list of exclusive choices; each choice has a visual indication of being "on" or "off"; at any one time, only one choice is "on"; by clicking on a specific choice, that specific choice is turned "on", and the other choices in that area are turned off.

3. —(not shown) "On/Off Choices": these are usually designated by a text description or an icon designating a choice, along with a check box; when either the check box itself, or the icon or description for a specific choice is clicked upon, that check box changes state from "off" to "on", or from "on" to "off". Typically, "on" is designated by a check in the check box; "off" is designated by no marking being in the box.

4. "Buttons" —230 which are represented by text or an icon, which are selectable regions as described above, and which, once clicked, cause a specific action to be performed.

When inactive, some of the above elements can be "grayed out", visually depicted by reducing the degree of contrast that user interface element has against its background; for example, when a graphical user interface element is normally represented by black against white, when it is "grayed out", it may be gray against white. When an element is grayed out, clicking on that element has no action.

Figure 3:
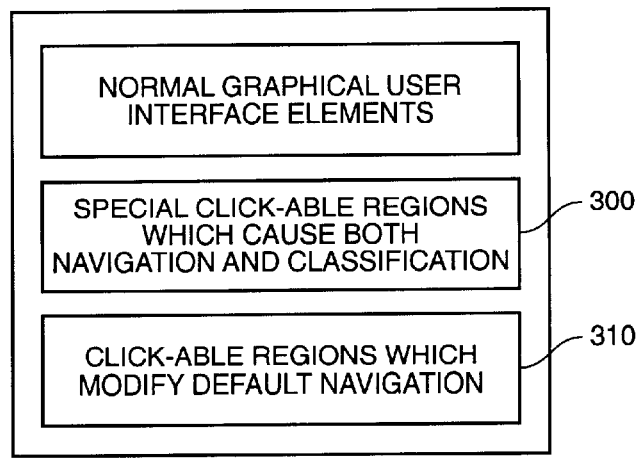
FIG. 3 illustrates graphical user interface elements.

FIG. 3 illustrates graphical user interface elements of the preferred embodiment of the present invention:

In addition to having the above elements, the embodiments of the present invention may have the following unique characteristics:

1. There are two or more areas—300 (designated by a text description, a graphic icon, or both) which, when clicked upon (that event hereinafter called "the click"), typically performs two or more actions:

a. The user classifies the message into a specific category; for example, the user may indicate how the user rates the message on a scale of 1 to 10 by clicking on the specific number, the numbers from 1 to 10 being listed as choices in the graphical user interface; or the user may classify the message as an advertisement or as not being an advertisement; or the user may perform some other classification of the message. User classifications are used by the system to determine which messages are likely to be of interest to which users; for example, the system can determine which users rate messages similarly, and make it easy for a user to see messages which are highly valued by other users who tend to classify messages in a way which is similar to the user.

b. A "navigation" event also occurs; a navigation event is an event whereby the message which was displayed at the time the user performed the click is no longer visible, and some other information becomes visible; for example, the next message, the previous message, a list of messages portrayed by their subject lines, etc. In general, Navigation allows the user to go on to the next item, return to a particular location, etc.

2. There are two or more areas—310 which, when clicked upon, typically affect the nature of the navigation which occurs when the user performs the classification. For example, the graphical user interface could include a radio-button choice between navigating to the next message in a list of messages sharing a specific subject, navigating to the previous message in such a list, or going back to a list of messages depicted by the subjects associated with those messages.

In addition to the two or more areas with the above-described characteristics, there may be other regions which can be clicked to perform one or the other of these actions; for example, one button may navigate the user to make the current message disappear and show the next message without classifying this message; additionally, there maybe a button which allows the user to classify the message without having the message disappear.

EXAMPLE

FIG. 2 illustrates a typical graphical user interface (GUI) according to the preferred embodiment of the present invention.

In this example, initially, the user selects the navigation direction. As illustrated "Back to thread" 230 or "Up to top" 240 are the navigation options. Then when the user clicks on a classification button such as "Thanks a lot" 250, "Thanks" 260, "No Thanks" 270, "Offensive 280 ", "No Response 290 " then the user will classify the message in the system, and the system will navigate to the information specified (e.g. "Back to Threads" or "Up to Top"). In this example, the current message will typically be replaced by a list of "threads" associated with the discussion group. Other types of classification can be used for example, "Commercial", "Off Topic", "Writer of Message does not belong in Group", "Great", etc.

In this example, if the user clicks on "No thanks . . . . " 270, then the user will classify the current message as "No thanks . . . " (in other words the user is indicating that they do not value the message), and will also see a higher-level set of choices, such as the list of discussion groups.

In this example, the classification buttons are given twice, so that if the message is larger than a screen full of text, the user can navigate at the top of the message or at the bottom of the message.

Note that in the preferred embodiment of the present invention, when there are several messages on a single topic, the system adds "next message" and "previous message" to the "back to threads" and "up to top" navigation options.

If the "next message" or the "previous message" radio button is initially selected, when the user clicks upon on any classification button, such as "OK", the message is classified and the user is simultaneously presented with the next message.

The "Skip Voting" button is typically selected when the user has decided not to read the entire message and thus does not want to classify the message; instead, the system navigates without classifying.

Typically, the classification, average rating, or an aggregate rating (is based on a group of users typically having similar voting patterns, demographics, interests, and other conventional basis) of a message is maintained in a database. The rating of a message by past users can thus be determined and reviewed by future users. Thus, instead of reading all messages, a user may decide to read a message only having an average rating above some threshold. To do this, the user can review the ratings of each message, or have a message filter that filters-out messages having a rating below a threshold the user has set.

Alternatively, such ratings may not be distributed to users, but used for different purposes. For example, marketing purposes, formation of special interest groups, etc.

Further, highly rated messages within a group may be automatically routed to other message groups that have similar interests, routed to upper management, and routed in general to a wider message audience.

In one embodiment of the present invention, each user that reviews a message has equal voting weighting, i.e. one user, one vote, however in alternative embodiments, the weighting of different users can be adjusted. For example, a particular user's vote may carry less weight if the particular user rates all messages as "Offensive". Any conventional system can be used to implement such a feature, for example assigning voting points per user, using a fractional vote per user, etc. One basis for adjusting a user's voting weight is upon the user's voting record.

Preferably, users' ratings are maintained in a database. In particular, the voting record of a particular user can be recorded, monitored, and used. For example, if a particular user always seems to vote opposite of how others vote, the voting weight of the particular user may be increased or decreased. Further, if a particular user seems to vote in the majority, the voting weight of the particular user may be increased or decreased. It is noted that by decreasing the former and increasing the latter voting weights tends to encourage collaboration, while increasing the former and decreasing the latter voting weights tends to encourage diversity in opinion.

If the user votes twice, the database can be used to note the previous vote, remove it, and insert the new vote; also, the system must include mechanisms to detect double-voting; for example, 200 votes coming from the same TCP/IP address may be treated as one vote.

Other basis for increasing or decreasing a particular user's voting weight include, for being the author of messages, for being the author of highly rated or lowly rated messages, for proposing plans, and actions, for convincing other users to commit to an action, etc. Any other type of feedback system based upon performance can be used to increase or decrease voting weight, and are included in alternative embodiments of the present invention.

Alternative Embodiments

1) In alternative embodiments of the present invention the navigation behavior can be made intelligently by deciding the "default" navigation behavior. For example, if users typically prefer to see the next message when they've finished reading a message, the corresponding radio button can be the one which is initially selected. That way, the user typically only needs to click on one button to navigate between messages.

2) In another embodiment, it is possible include classification and navigation on more than one message at a time. For example, the system can display to the user as many messages as will fit on a single screen. In this embodiment, the notion of navigation is changed so that instead of ceasing to display a single message, the system ceases to display all currently displayed messages, and either a new group of messages is displayed or some other information is displayed instead. Further, the notion of classification is applied to all displayed messages instead of to just one at a time.

3) In another embodiment, of 2) above, it is also possible to place modifiers near individual messages to indicate exceptions; for example, the user may classify all of the messages as "No Thanks . . . " except for a particular message. For that particular first message, the user can rate the message as a "Thanks".

4) In another embodiment, the user's classification of a message can be applied not only to that specific message, but also to all other messages written by whoever wrote the rated message. In this way, the writers of messages are being rated for other users to see.

5) In another embodiment, instead of a mouse click to trigger a selection a keyboard selection can be used. For example, pressing "P" could select the "previous message" radio button, and pressing "O" could corresponding to clicking on "Offensive!". In this example, the user is thus pressing "P" and then "O", at which point the system classifies the message and displays the previous message to the user. Alternatively, the user can define a set of single key strokes, each corresponding to an action and a rating. For example, "A" could mean forward to next message and rate the read message highly.

6) In another embodiment, the navigation and classification functions are reversed, for example, radio buttons are used to select the classification, and navigation buttons trigger both classification and navigation.

7) In another embodiment, incentives can be given to users to encourage them to rate messages. For example, users can be acknowledged for each classification they perform with "points" which can be exchanged for something of value; or the user can be rewarded in similar ways for providing classifications which are predictive of the responses of a large number of other users. Points can also be rewarded for proposing and completing actions.

Figure 4:
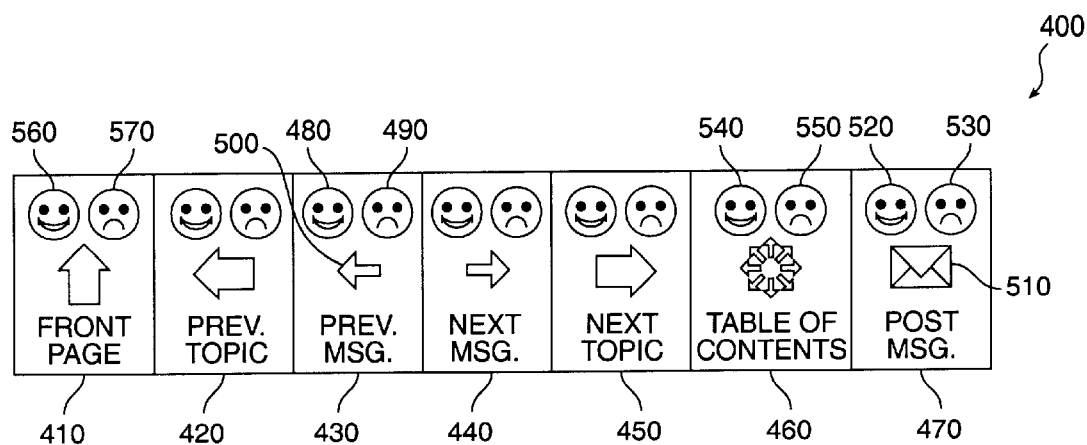
FIG. 4 illustrates another embodiment of the present invention.

8) FIG. 4 illustrates another embodiment of the present invention.

As illustrated in FIG. 4, the GUI 400 includes five icons that represent actions: (from left to right) return to the first page list (List)—410, go to the previous topic (Previous)—420, back-up one message (Back)—430, go forward one message (Forward)—440, go to the next topic (Next)—450, return to the table of contents (TOC)—460, and post a message (Post)—470. Text describing each icon may or may not be provided in alternative embodiments. The number of icons can be readily increased or decreased based upon exact application.

Each icon preferably includes rating/navigation portions, and a pure navigation portion. For example, as illustrated in FIG. 4, the Back-up one message icon 430 includes rating/navigation portions comprising a happy face 480 and a sad face 490, and the pure navigation portion—500 comprises an arrow pointing to the left. In alternative embodiments of the present invention, a greater range of rating/navigation portions can be included, for example, faces between happy face and sad face. As an alternative to faces ratings, stars, numbers, pictures, or the like are used for the current message for rating/navigation purposes. In one example, a number of stars can be shown on an icon. By clicking on a particular star, the user rates the message. For example, if five stars are shown and the user clicks on the third star, the user gives the message a three out of five rating.

Ratings of the messages in various embodiments, include agreement/disagreement with the current message, positive/negative contribution of the current message, emotional response to the current message, and the like.

In operation, the user may navigate without rating by simply choosing the pure navigation portion of the icon that represents the user's wish. For example, the user may click on the envelope picture porion—510 of the Post icon to post a message at that current message thread location. Alternatively, the user may rate the message by clicking upon the happy face portion—520 of the post icon or the sad face portion—530 of the post icon, and post a message at that current message thread location. It is preferred that the GUI be intuitive, thus clicking upon the happy face portion rates the current message positively whereas clicking upon the sad face portion rates the current message negatively.

In alternative embodiments, the rating of the current message varies between each of the displayed icons. For example, in the TOC icon 460, a user clicking upon the happy face—540 represents a meaning that the current discussion group is interesting whereas a user clicking upon the sad face—550 represents a meaning that the current discussion group is uninteresting, and that the system should return to the message lists. At the same time, in the List icon—410, a user clicking upon the happy face—560 represents that the current message thread is relevant, whereas a user clicking upon the sad face—570 represents a meaning that the current message thread is irrelevant, and that the system should return to the list of topics in that discussion group.

In other alternative embodiments, the icons do not include a pure navigation portion and only include rating/navigation portions, thus the user is forced to give some opinion, no matter what action the user desires. The pictures of the arrows, envelopes, etc upon the icons preferably remain to provide the user with visual navigation clues. Other combinations of features of the illustrated and disclosed embodiments are envisioned in light of the present patent disclosure. For example, sounds can be produced when the user clicks on different portions of the icons to confirm that selection. In particular, clapping sound when approval is indicated or boos when disapproval is indicated.

Applications

The preferred embodiment of the invention is directed to making discussion groups more interesting by improved collaborative filtering by using the previously indicated message ratings, author ratings, and the like; for example, discussion groups about sports such as baseball, discussion groups about financial information such as stocks, and discussion groups about other hobbies, interests, and business activities. Such groups can also have "meetings" in which messages are passed back and forth. Such meetings can be guided by Robert's Rules of Order, or any other manual or automatic group management system.

CONCLUSION

In the foregoing specification, the invention has been described with reference to specific exemplary embodiments thereof. Many changes or modifications are readily envisioned. In particular, it is envisioned that people may be grouped according to rating of messages. For example, users may be grouped into a messaging group based upon similarity in opinions on messages, in voting pattern, in voting weight, etc. Further, although the present embodiments have been described with respect to messages and message threads, other types of items can be rated, for example, documents in general, such as textual works including indices, visual works, audio works, and combinations thereof, executable software such as JAVA, Active-X applets, etc., software objects under an object-oriented paradigm, and any other types of items a user can rate. Combinations of the above embodiments are obvious in light of the present patent disclosure.

The presently claimed inventions may also be applied to other areas of group decision making, for example, determining the allocation of resources, such as human, or capital, to determine and adopt new policies, to commit users to action, etc.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for displaying documents on a display, comprising:

displaying a first document on the display;

displaying a first selectable region on the display;

displaying a second selectable region on the display;

detecting a selection of the first selectable region or the second selectable region on the display; and simultaneously indicating a rating value for the first document and requesting display of a second document on the display in response to the selection.

2. The method of claim 1 wherein indicating the rating comprises:

indicating a first user rating value for the first document when the selection is the first selectable region.

3. The method of claim 2 wherein indicating the rating further comprises:

indicating a second user rating value for the first document when the selection is the second selectable region.

4. The method of claim 2 wherein indicating the rating further comprises:

indicating the rating value in response to the first user rating value and sending the rating value to a host computer system.

5. The method of claim 1 wherein the first document is a first message and the second document is a message thread.

6. The method of claim 1 wherein the selection of the first selectable region or the second selectable region on the display comprises detection of a single user action.

7. The method of claim 6 wherein the single user action comprises clicking upon the first selectable region of the second selectable region on the display.

8. The method of claim 7 wherein the first document is a web page.

9. A method for displaying messages on a computer system having a memory and a display, comprising:

displaying a first message on the display;

providing a first user-selectable region on the display;

providing a second user-selectable region on the display;

selecting the first selectable region on the display; and simultaneously indicating a first rating value for the first message and requesting display of a second message on the display in response to selection of the first selectable region.

10. The method of claim 9 further comprising determining a navigation direction for messages, the navigation direction for the first message leading to the second message.

11. The method of claim 9 wherein the first rating value is associated with the first message in the memory.

12. The method of claim 11 further comprising having a host computer system determine an average rating value for the first message in response to the first rating value.

13. The method of claim 11 further comprising having a host computer system distribute the first message to another user when the average rating value for the first message exceeds a threshold value.

14. The method of claim 11 further comprising having a host computer system associate the first rating value with an author of the first message in response to selection of the first selectable region.

15. The method of claim 9 further comprising having a host computer system associate the first rating value with a user that selects the first selectable region.

16. The method of claim 15 further comprising having the host computer system determine a voting weight of the user in response to the first rating value.

17. The method of claim 9 wherein a rating value of the second message has a value at least equal to a threshold value.

18. The method of claim 9 further comprising:

selecting the second selectable region on the display; and simultaneously indicating a second rating value for the first message and requesting display of a second message on the display in response to selection of the second selectable region;

wherein the first rating value for the first message is different from the second rating value for the first message.

19. The method of claim 18 wherein the selection of the first selectable region and the second selectable region on the display comprises a single user action.

20. The method of claim 19 wherein the single user action comprises clicking upon the first selectable region of the second selectable region on the display.

21. A computer system for providing document navigation for a user computer system, comprising:

means for providing a first document to the user computer system;

means for providing an icon for display on the user computer system, the icon including a first portion and a second portion;

means for receiving a selection signal of the icon at the first portion of the icon or the second portion of the icon from the user computer system;

means for providing a second document to the user computer system when the icon is selected; and means for performing a rating function on the first document when the first portion of the icon is selected.

22. A method for navigating within a message thread on a computer system having a memory and a display, comprising:

displaying a message on the display;

displaying an icon on the display, the icon including a first portion and a second portion;

receiving a selection signal of the icon at the first portion of the icon or the second portion of the icon;

performing a navigation function within the message thread when the icon is selected; and performing a rating function of the message when the first portion of the icon is selected.

23. The method of claim 22 wherein performing the navigation function comprises displaying another message on the display within the message thread.

24. The method of claim 22 wherein performing the navigation function comprises exiting from the message thread.

25. The method of claim 22, wherein the first portion of the icon comprises a first rating portion of the icon and a second rating portion of the icon, wherein receiving a selection signal comprises receiving a selection signal of the icon at the first rating portion of the icon, the second rating portion of the icon, or the second portion of the icon; and wherein performing the rating function comprises:

assigning a first rating to the message when the first rating portion is selected; and assigning a second rating to the message when the second rating portion is selected.

26. A computer program product for a computer system for displaying messages on a user computer system including a processor and a display, comprising:

a computer-readable media comprising:

code that directs the processor to provide a first message to the user computer system;

code that directs the processor to provide a first user-selectable to a display on the user computer system;

code that directs the processor to provide a second user-selectable to a display on the user computer system;

code that directs the processor to determine a selection of the first selectable region on the display of the user computer system; and code that directs the processor to determining a rating value for the first message and to provide a second message to the user computer system, in response to the selection of the first selectable region.

27. A computer system including a processor and a display for displaying messages on a user computer system, the computer system comprising:

a computer-readable media comprising:

code that directs the processor to provide a first message for display onto a display of the user computer system;

code that directs the processor to provide the user computer system with a first user-selectable region on the display of the user computer system;

code that directs the processor to provide the user computer system with a second user-selectable region on the display of the user computer system;

code that directs the processor to determine a selection of the first selectable region on the display of the user computer system; and code that directs the processor to determining a rating value for the first message and to provide a second message for display onto the display of the user computer system, in response to the selection of the first selectable region.

* * * * *